(12) United States Patent
Van Sickle (10) Patent No.: US 12,073,271 B2
(45) Date of Patent: Aug. 27, 2024

(54) METHOD AND SYSTEM FOR GENERATING MATRIX CODE PRINT FILE

(71) Applicant: XR Goods Company, Lakewood, CO (US)

(72) Inventor: Schuyler Justin Gordon Van Sickle, Lakewood, CO (US)

(73) Assignee: XR Goods Company, Lakewood, CO (US)

( * ) Notice: Subject to any disclaimer, the term of this patent is extended or adjusted under 35 U.S.C. 154(b) by 0 days.

(21) Appl. No.: 18/357,203

(22) Filed: Jul. 24, 2023

(65) Prior Publication Data

US 2024/0037362 A1    Feb. 1, 2024

Related U.S. Application Data

(60) Provisional application No. 63/369,416, filed on Jul. 26, 2022.

(51) Int. Cl.
*G06K 19/06* (2006.01)
*G06K 15/02* (2006.01)

(52) U.S. Cl.
CPC ..... *G06K 19/06093* (2013.01); *G06K 15/021* (2013.01); *G06K 15/1842* (2013.01); *G06K 19/06037* (2013.01); *G06K 19/06103* (2013.01)

(58) Field of Classification Search
CPC ........... G06K 19/06093; G06K 15/021; G06K 15/1842; G06K 19/06037; G06K 19/06103
USPC ......................................................... 235/494
See application file for complete search history.

(56) References Cited

U.S. PATENT DOCUMENTS

| | | |
|---|---|---|
| 8,550,367 B2 | 10/2013 | Fan et al. |
| 8,807,442 B2 | 8/2014 | Fan et al. |
| 9,858,518 B2 | 1/2018 | Nishizaki |
| 2021/0034032 A1 | 2/2021 | Hebenstreit et al. |

OTHER PUBLICATIONS

International Search Report and Written Opinion for PCT/US2023/70798 dated Jan. 29, 2024, 15 pages.
https://mobile-ar.reality.news/news/pumas-qr-code-covered-sneakers-put-augmented-reality-center-design-with-mixed-results-0195635/, accessed Jul. 18, 2023.

*Primary Examiner* — Daniel A Hess
(74) *Attorney, Agent, or Firm* — Fox Rothschild LLP (57) ABSTRACT

A method of generating a barcode pattern includes: identifying a silhouette comprising a boundary within which a barcode pattern is to be printed; generating a barcode pattern comprising multiple instances of a two-dimensional barcode, in which the instances include barcodes of at least two different sizes; and generating a print file that includes information for printing the barcode pattern within the silhouette.

20 Claims, 8 Drawing Sheets

METHOD AND SYSTEM FOR GENERATING MATRIX CODE PRINT FILE

RELATED APPLICATIONS AND CLAIM OF PRIORITY

This patent document claims priority to U.S. provisional patent application No. 63/369,416, filed Jul. 26, 2022, the disclosure of which is fully incorporated into this document by reference.

BACKGROUND

Barcodes have many applications for communicating information via electronic systems. Two-dimensional (2D) barcodes, also known as matrix codes, are especially useful because they can encode digital information that is read by digital cameras. Examples of 2D barcodes include Quick Response (QR) codes, Aztec codes, MaxiCodes, Data Matrix codes, and Microsoft Tags.

Printing barcodes on surfaces that do not consistently remain flat, such as clothing, hats, beverageware, or even paper (which can be folded or crumpled), can result in barcode scanning errors. If a surface is creased, curved, or otherwise not clear or fully visible to an electronic device's camera, the device's barcode scanning application may not be able to correctly decode the information embedded within the barcode.

This document describes methods and systems that are designed to address these issues, and/or other issues.

SUMMARY

This document describes methods, systems for implementing the methods, and computer program products that cause systems to implement methods of generating a barcode pattern that can be used by a print device to print a barcode pattern on a substrate. The methods include identifying a silhouette comprising a boundary within which a barcode pattern is to be printed. The methods also include generating, from a two-dimensional (2D) barcode, a barcode pattern comprising multiple instances of the 2D barcode. In some embodiments, the instances comprise barcodes of at least two different sizes. The methods also include generating a print file comprising information for printing the barcode pattern within the boundary of a silhouette.

DETAILED DESCRIPTION

As used in this document, the singular forms "a," "an," and "the" include plural references unless the context clearly dictates otherwise. Unless defined otherwise, all technical and scientific terms used herein have the same meanings as commonly understood by one of ordinary skill in the art. As used in this document, the term "comprising" (or "comprises") means "including (or includes), but not limited to." When used in this document, the term "exemplary" is intended to mean "by way of example" and is not intended to indicate that a particular exemplary item is preferred or required.

In this document, when terms such "first" and "second" are used to modify a noun, such use is simply intended to distinguish one item from another, and is not intended to require a sequential order unless specifically stated. The term "approximately," when used in connection with a numeric value, is intended to include values that are close to, but not exactly, the number. For example, in some embodiments, the term "approximately" may include values that are within +/−10 percent of the value.

When used in this document, terms such as "top" and "bottom," and "upper" and "lower", are not intended to have absolute orientations but are instead intended to describe relative positions of various components with respect to each other. For example, a first component may be an "upper" component and a second component may be a "lower" component when a device of which the components are a part is oriented in a first direction. The relative orientations of the components may be reversed, or the components may be on the same plane, if the orientation of the structure that contains the components is changed. The claims are intended to include all orientations of a device containing such components.

Additional terms that are relevant to this disclosure will be defined at the end of this Detailed Description section.

Figure 1:
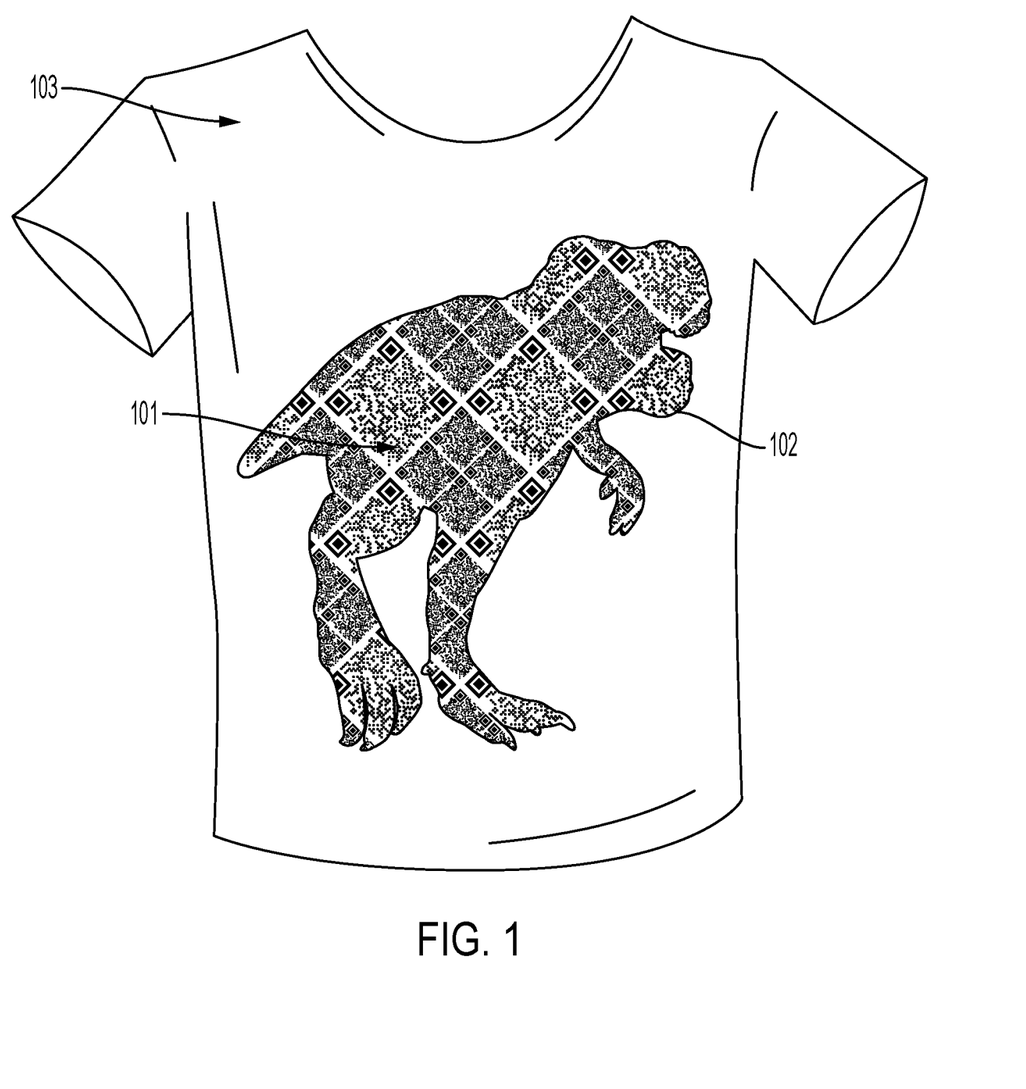
FIG. 1 illustrates an example of a two-dimensional (2D) barcode pattern printed within a silhouette on a substrate.

FIG. 1 illustrates an example of a two-dimensional (2D) barcode pattern 101 printed within a silhouette 102 on a substrate 103. This document will describe novel methods and systems for generating a print file for an augmented barcode pattern such as that shown in FIG. 1.

Figure 2:
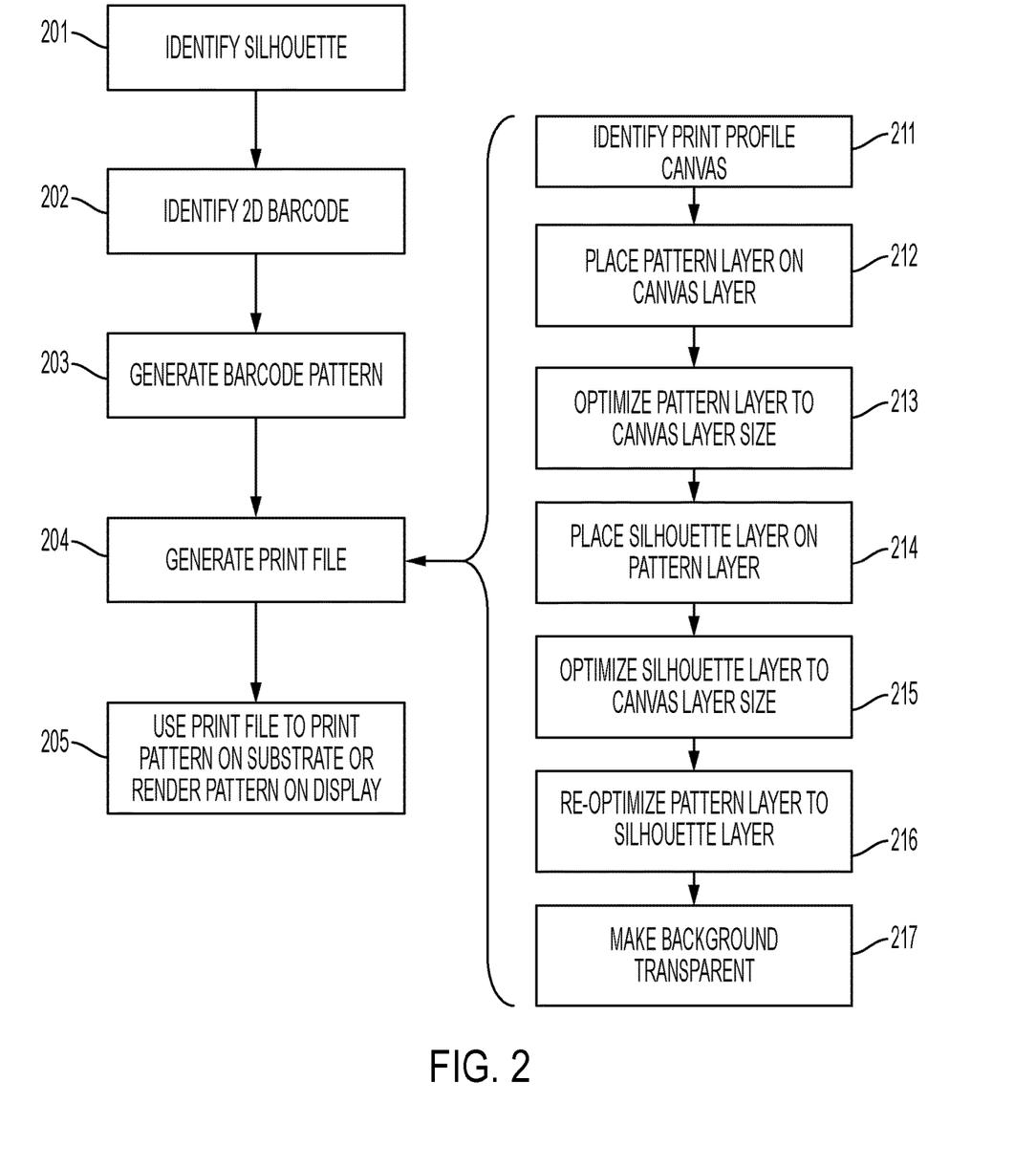
FIG. 2 is a process flow diagram illustrating a process for generating a 2D barcode pattern.

FIG. 2 is a flow diagram illustrating a process for generating an augmented barcode pattern. A computing device that executes programming instructions to implement a barcode pattern generation system will identify a silhouette (step 201). A silhouette is any closed boundary within which a barcode pattern may be printed. Optionally, in various embodiments, the boundary of the silhouette may include one or more curved segments and/or other segments that define a boundary that does not conform to a regular geometric shape as is defined in the field of geometry, such as a polygon, circle, or oval. For example, the boundary of a silhouette may have any shape such as that of an animal, a plant, a building, a sporting good or tool, etc. FIG. 1 shows an example silhouette 102 in the shape of a dinosaur. However, this is not a requirement, as the methods and systems described in this document can also be used to print barcode patterns within a boundary that exhibits a regular geometric shape.

A silhouette also may include a background color value, typically (although not necessarily) a value in the range of 0 to 256 on the RGB color scale. Other scales and value ranges may be used, such as values ranging from 0 to 1 in a grayscale, colors in the Pantone Color Matching System (PMS), a value on a CMYK color scale, or hexadecimal value or an applicable scale. To identify the silhouette, the system may retrieve a set of candidate silhouettes from memory and output the candidates on a user interface via which a user may select one of the candidate silhouettes for use. Alternatively, the system may receive a silhouette definition from a user via a user interface, or via a message from an external system. As an additional alternative, the system may include a user interface and execute a graphic design application via which a user may design a new silhouette and save to the system an instruction file for generating the new silhouette.

At 202 the system will identify a 2D barcode to be printed as a pattern within the silhouette. As noted above, the 2D barcode may be a QR code, Aztec code, MaxiCode, Data Matrix code, Microsoft Tag, or any other type of matrix code within which information may be embedded as a pattern of shapes or symbols. When this document uses the term "barcode", it is unless a specific type of code is named the term is intended to cover any such code format, including those currently known and those which may be developed in the future. The system may identify the 2D barcode by receiving it in a message or via a user input, or the system may include candidate barcodes which a user may select. Alternatively, if no barcode is available or provided, the system may generate a 2D barcode using any now or hereafter known barcode generation process. As an additional alternative, the system may receive information to be encoded, and the system may send that information to an external barcode generation application, which will generate the barcode and return the barcode to the system.

Figure 3:
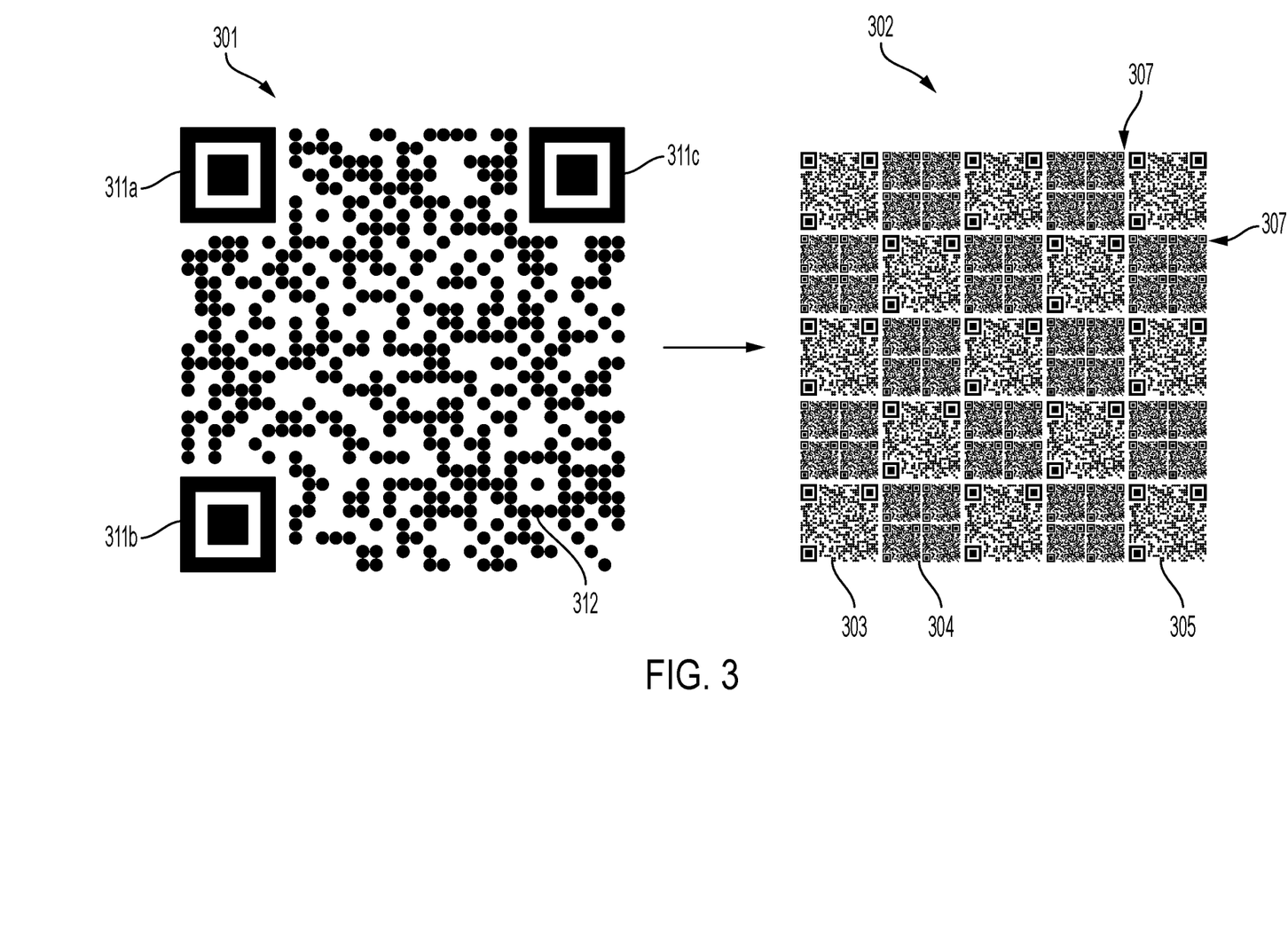
FIG. 3 illustrates an example conversion of a 2D barcode into a barcode pattern

At 203 the system will generate a barcode pattern that is a matrix that includes various instances of the barcode, replicated throughout the pattern. Optionally, the system may modify the size of one or more instances of the barcode to present the barcode in at least two different sizes in the barcode pattern. For example, as shown in FIG. 3, the system may generate a barcode pattern 302 that is an array containing multiple instances of barcode 301. As is known in the art, a barcode 301 that is a QR code includes positioning markers 311a-311c, sometimes referred to as eyes, that are located in multiple corners of the barcode 301 and which have a defined pattern that barcode scanners are programmed to identify the barcode as a QR code. The barcode 301 also includes one or more alignment marker 312, each of which is a defined pattern, typically different from and smaller than that of the positioning markers, that barcode scanners are programmed to use to recognize and use to identify the orientation of the barcode and smooth out any curves of a substrate on which the barcode appears. A QR code also has other elements, such as a timing pattern, version information markers, format information, and a "quiet zone" consisting of blank space around the printed elements to serve as a border and enable a barcode scanner to distinguish the barcode from the substrate on which it appears.

Some of the cells of the array (such as cell 303) include a single instance of the barcode in a first size. Optionally, other cells of the array (such as cell 304) include a sub-pattern containing multiple instances of the barcode 301 in a second size that is smaller than the first size. In this example, the cells of each row and column alternate between containing barcodes of the first size (such as cell 303) and multiple barcodes of the second size (such as cell 304) as shown. Variations of the barcode pattern may include other arrangements, and more than two sizes or sub-patterns. The use of at least two sizes of barcodes in the pattern, in options that implement it, will help ensure that a camera can capture at least one instance of the barcode within the pattern, as will be described below.

Optionally, when replicating the barcode to various cells within the matrix, the system may rotate certain instances the barcode so that the barcode is positioned with more than one orientation throughout the various instances of the barcode in the matrix. For example, in the barcode pattern 302 of FIG. 3, the barcode is oriented in cell 303 so that its positioning markers 311a-311c are located in the bottom left, top left, and top right corners of the cell 303, while in cell 305 the barcode is oriented so that its positioning markers 311a-311c are located in the top left, top right, and bottom right corners of the cell 305. In addition, the variation in orientations also causes alignment marker 312 of the barcode to appear in the lower right quadrant of cell 303 but in the lower left quadrant of cell 305.

In addition, when replicating the barcode to various cells within the matrix, the system will position each instance of the barcode at least a minimum distance (such as a minimum distance of 2 pixels) away from each other instance of the barcode in the matrix, so that a blank space 307 (i.e., the "quiet zone" mentioned above) surrounds each instance of the barcode in the matrix. Other elements of the barcode, such as pixels that convey format information, data and error correction keys, version information, and a required pattern, may appear in different quadrants of different cells due to the varying orientation.

Also optionally, in some embodiments the system may receive multiple barcodes at step 202, each of which encodes different information. If this happens, then when generating the barcode pattern at 203 the system may replicate each of the barcodes throughout the pattern so that each barcode appears within the pattern at least once.

Returning to FIG. 2, at 204 the system will generate a print file comprising information for printing the barcode pattern within the silhouette. The right column of FIG. 2's flow diagram illustrates, and the following paragraphs describe, an example process that the system may implement to do this.

At 211 the system will identify a print file canvas, which is a bounded area within which the barcode pattern is to be printed. The print file canvas will include, at a minimum, a boundary for an area. The boundary may have a size and shape that corresponds to an area of a substrate within which the barcode pattern is to be printed. For example, the print file canvas may cover the chest area of a shirt, a side of a beverage mug, the front panel of a baseball hat, or the like.

Figure 4:
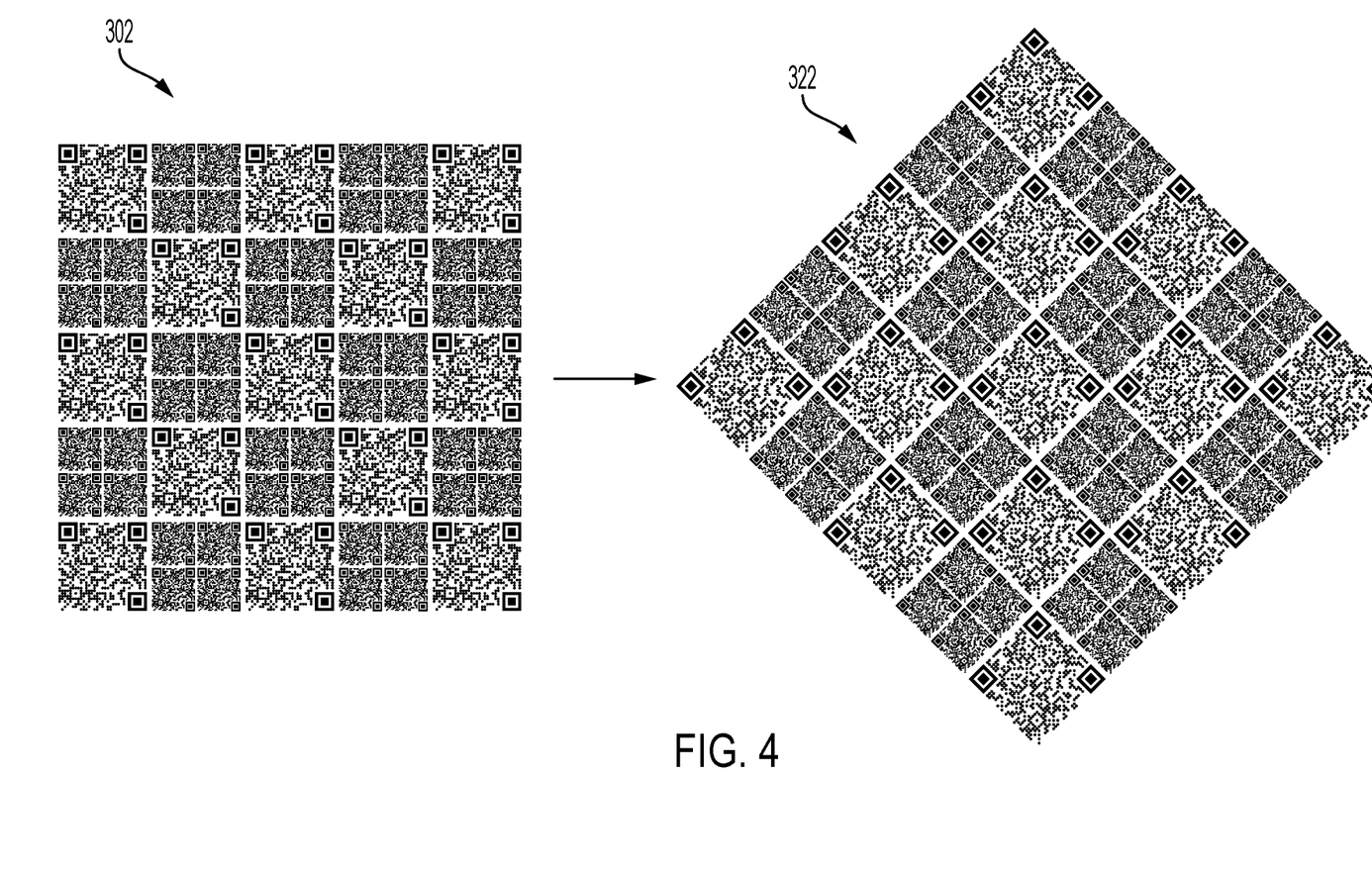
FIG. 4 illustrates an example optimization of a barcode pattern layer to a print file canvas.

At 212 the system will place some or all the barcode pattern (such as pattern 302 of FIG. 2) as a layer within the print file canvas, and at 213 the system will optimize the barcode pattern layer to the print file canvas layer. As used in this document the term "optimizing" does not necessarily require generating an absolute ultimate result; instead, it refers to adjusting an appearance of the layer to satisfy multiple parameters, such as filling a boundary area while maintaining at least one full barcode within the boundary at a minimum threshold pixel size. If two or more different barcodes that encode different information are replicated in the pattern, the system will ensure that at least one instance of each barcode fully appears within the boundary with at least the minimum pixel size. Optimizing the barcode pattern in step 213 involves (a) placing the pattern in the print canvas layer so that each pixel of at least one instance, and optionally each instance, of each barcode that appears in the barcode pattern when printed will have no less than a minimum pixel size, (b) shifting the orientation of the pattern to match that of the print file canvas, and (c) either expanding the size of the pattern to full the canvas or trimming the pattern at the borders of the print file canvas layer. This will yield a first modified barcode pattern layer that is optimized to the print canvas layer. An example of this is shown in FIG. 4, in which barcode pattern 302 is reoriented and expanded to fill the print file canvas, resulting in a modified barcode pattern layer 322.

At 214 the system will place the silhouette layer on the modified barcode pattern layer, and at 215 the system will optimize the silhouette layer to the print file canvas. Optimizing the silhouette layer to the print file canvas involves (a) placing the silhouette layer over the print file canvas layer, and (b) shifting the silhouette layer as necessary to cover as much of the bounded area of the print file canvas as possible.

Figure 5:
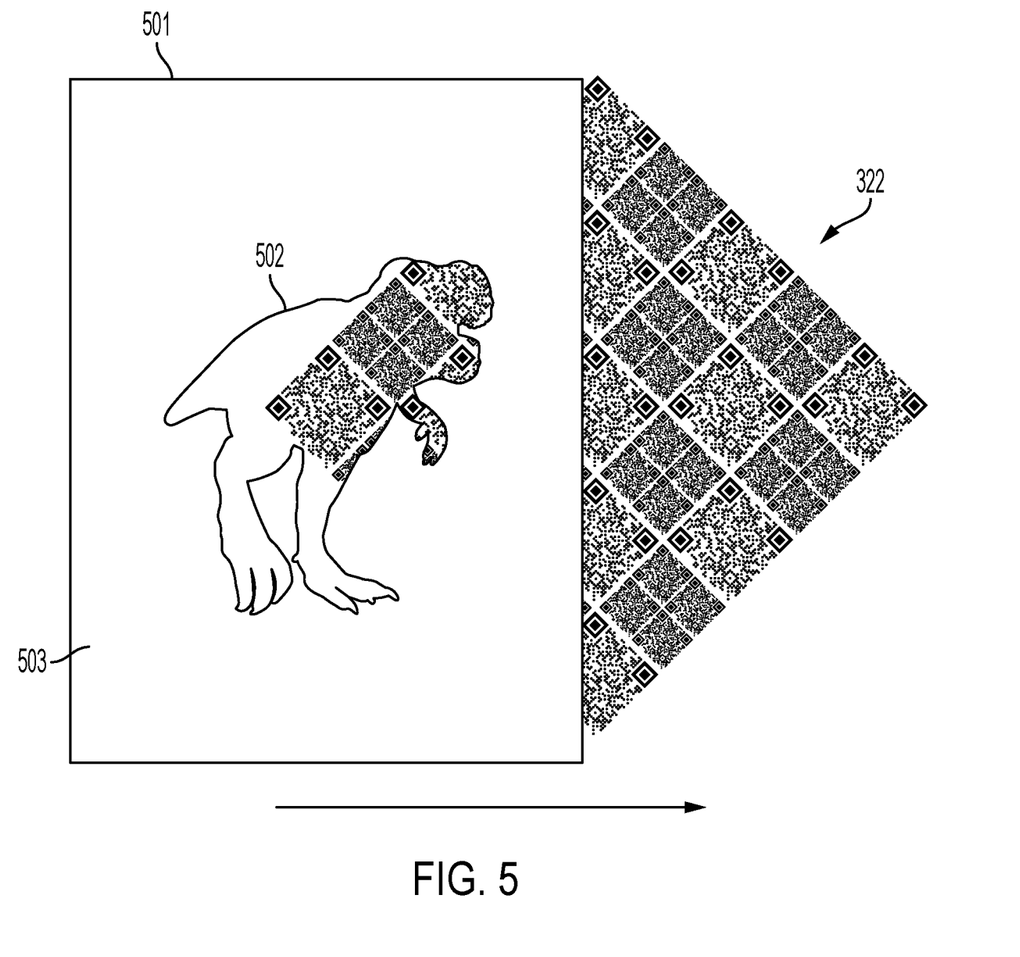
FIG. 5 illustrates an example placement of a silhouette layer onto a barcode pattern layer.

An example of this is shown in FIG. 5, in which silhouette layer 501 is placed on the modified barcode pattern layer 322 in a location where a cell with at least two instances of the barcode fully appear within the silhouette 502. (In this example, one large instance of the barcode fully appears, and four smaller instances of the barcode also fully appear, within the silhouette 502.) The silhouette layer is then shifted to the right to cover as much of the print layer as possible. Any portions of the modified barcode pattern layer 322 covered by the silhouette layer's background 503 will be masked (hidden) by the silhouette layer, while portions of the modified barcode pattern layer 322 that are covered by the silhouette 502 will appear through the silhouette 502. The modified barcode pattern layer also includes some instances of the barcodes that are do not fully appear within the silhouette, as those instances are cropped by the boundary of the silhouette.

Figure 6:
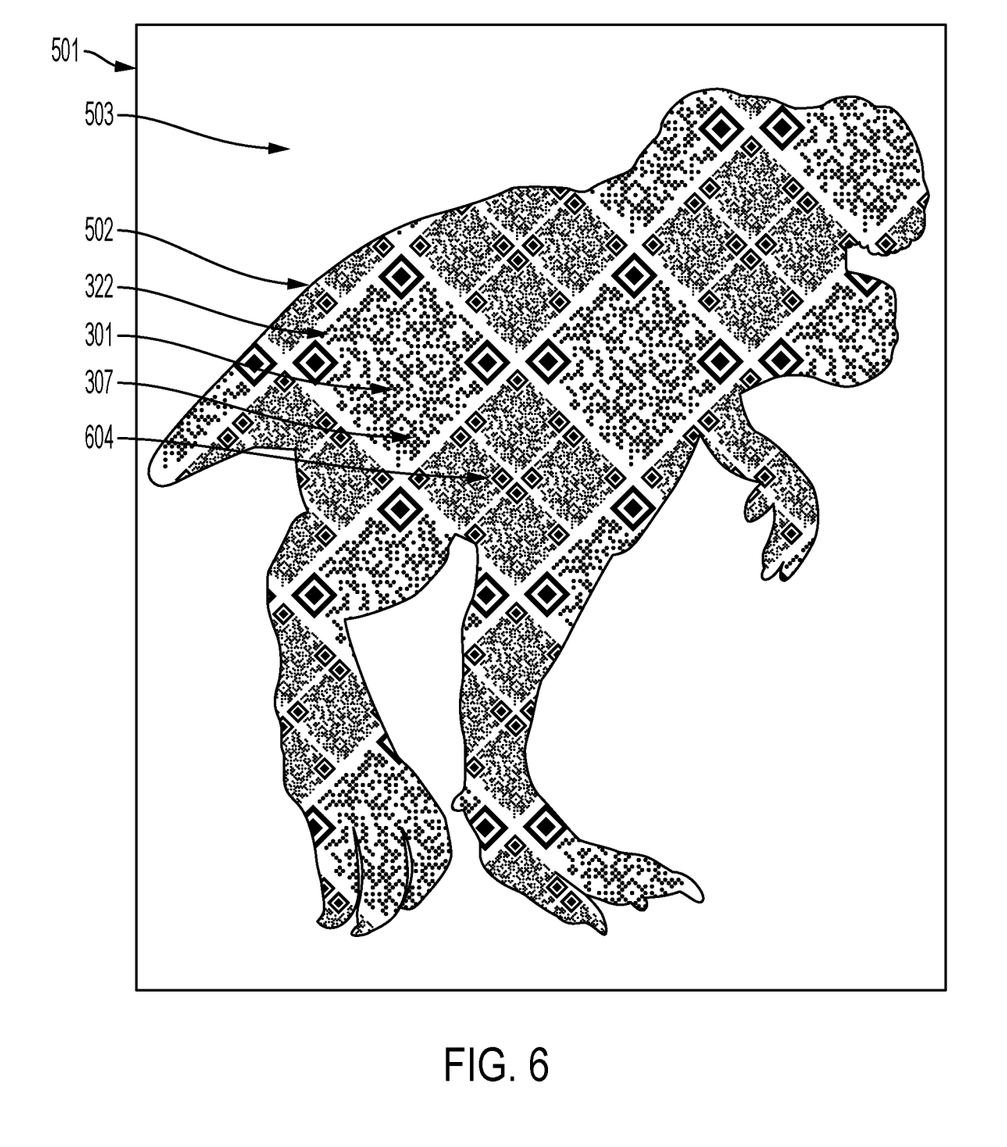
FIG. 6 illustrates an example optimization of a barcode pattern layer to a silhouette layer.

At 216 the system will re-optimize the modified barcode pattern layer to the silhouette layer. This may include expanding or contracting the modified barcode pattern layer to fully fill the silhouette, while maintaining a minimum pixel size for each barcode instance and satisfying one or more other rules for positioning the modified pattern layer within the silhouette. For example, the system may apply a rule that requires at least two instances of the barcode to fully appear within the silhouette. Another rule may require that the placement be one that maximizes the number of barcode instances that fully appear within the silhouette. An example of this is shown in FIG. 6, in which the modified barcode pattern 322 is shrunk within silhouette 502 so that multiple full instances of the larger-sized barcode 301 appear, along with two instances of cells 604 containing multiple relatively smaller instances of the barcode, are presented all while maintaining a minimum pixel size. The resulting barcode pattern layer also may include some instances of the barcodes that are do not fully appear within the silhouette, as those instances are cropped by the boundary of the silhouette.

At 217 the system may make the background transparent so that no information will be printed in the background area when the print file is executed by a printer. Optionally, this may involve trimming the print file canvas to match the outline of the silhouette, so that only areas within the silhouette are included within, and the background is not part of, the print file canvas.

All of the information described above will then be saved to the print file at 204 as instructions and/or parameters that a print engine may use to the print the barcode pattern on a substrate, that a display device may use to render the barcode pattern on a display. At 205 a print engine of a print device may then print the barcode pattern on a substrate, or a display device may render the barcode so that the barcode is output and viewable on the display device. The print device and/or display device may include the processor that generates the print file, may be part of a system of devices that includes that processor, or it may receive the print file from a system containing the processor after the processor generates the print file.

Optionally, to generate the print file 204 any or all of steps 211-217, and in particular any or all of the optimization steps (steps 213, 215, and 216), may be combined into a single optimization step. For example, the system may fit the barcode pattern layer to the print file canvas layer, place the silhouette on the barcode pattern layer to mask portions of the pattern layer that are not within the silhouette, and optimize the barcode pattern layer to the silhouette by (i) identifying the boundaries of the silhouette, and (ii) expanding or contracting the barcode pattern layer to fully fill the silhouette, while maintaining a minimum pixel size for each barcode instance and satisfying one or more other rules such as requiring that at least two instances of the barcode fully appear within the silhouette. As another option, the print file canvas layer may have the shape of the silhouette, in which case the system may simply fit and optimize the barcode layer to the print file canvas. Other optimization methods may be used as well.

Figure 7:
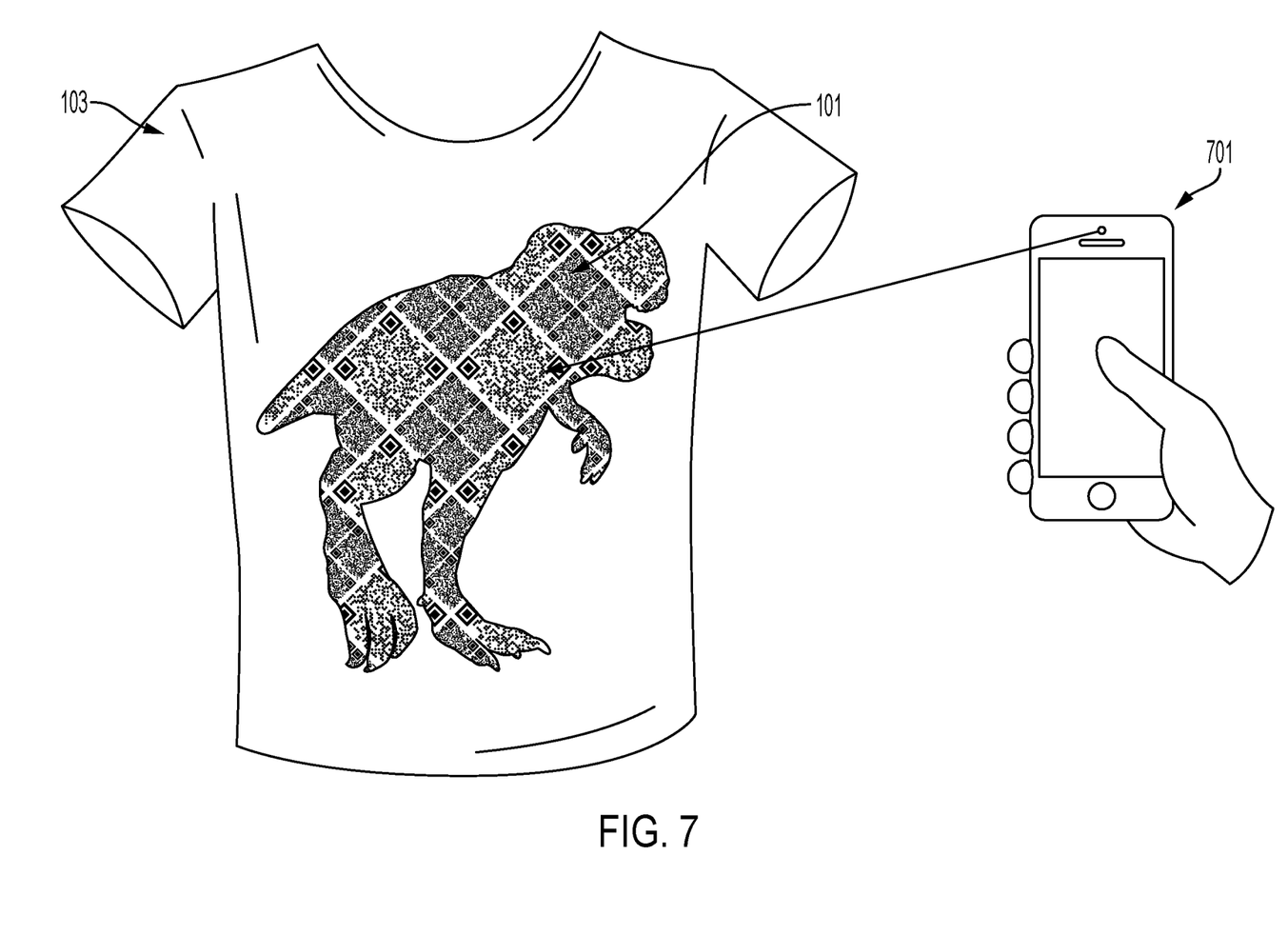
FIG. 7 depicts an example use case for a barcode pattern.

FIG. 7 illustrates that once the barcode pattern 101 within a silhouette is printed on a substrate 103, an electronic device 701 having a camera and an installed barcode scanning application can capture an image in the pattern, recognize and analyze one of the instances of the barcode that fully appears in the pattern to decode information from the barcode (such as the uniform reference locator (URL) of a website) as is known in the art, and use that information to take an action. Example actions may include, for example, using the URL to access the website via a web browsing application, or calling another application installed in the mobile device to take an action. If the barcode scanning application encounters an error or is not able to successfully decode the first barcode instance that it attempts to scan, it may then attempt to decode any of the other full barcode instances that appear in the image. The website may cause the browsing application to output, or the application that is called by the information in the barcode to output, a virtual reality or augmented reality ("AR") experience, such as an animation in which an animal or other object corresponding to the silhouette appears to move out from the real-world image of the substrate. In this context, the terms "augmented reality" and "virtual reality" are intended to include related technologies and experiences such as metaverse, Spatial Web, and Web3 experiences, as well as (in the case of AR) extended reality, mixed reality, and experiential reality experiences. The application that is called may be an application installed on the device, or a remote application such as a progressive web application (PWA).

To ensure device and data security, in some embodiments the barcode scanning application may require that the device's user provide permission for the application to access and use the device's camera, as well as one or more other sensors such as a microphone or an inertial measurement unit or other position or orientation sensor.

Figure 8:
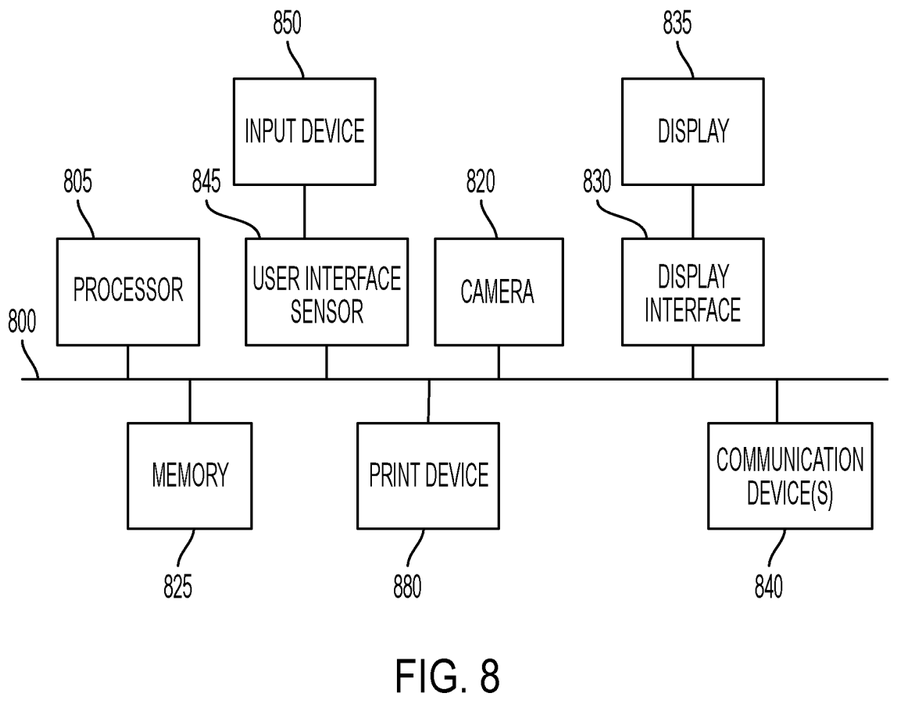
FIG. 8 depicts example hardware components that may be included in any of the electronic devices of the system.

FIG. 8 depicts example hardware components that may be included in any of the electronic devices of the system, such as the device that contains a camera, or a print that is used to print a pattern on a substrate. An electrical bus 800 serves as an information highway interconnecting the other illustrated components of the hardware. Processor 805 is a central processing device of the system, configured to perform calculations and logic operations required to execute programming instructions. As used in this document and in the claims, the terms "processor" and "processing device" may refer to a single processor or any number of processors in a set of processors that collectively perform a set of operations, such as a central processing unit (CPU), a graphics processing unit (GPU), a remote server, or a combination of these. Read only memory (ROM), random access memory (RAM), flash memory, hard drives and other devices capable of storing electronic data constitute examples of memory devices 825. A memory device may include a single device or a collection of devices across which data and/or instructions are stored.

An optional display interface 830 may permit information from the bus 800 to be displayed on a display device 835 in visual, graphic or alphanumeric format. An audio interface and audio output (such as a speaker) also may be provided. Communication with external devices may occur using various communication devices 840 such as a wireless antenna, a radio frequency identification (RFID) tag and/or short-range or near-field communication transceiver, each of which may optionally communicatively connect with other components of the device via one or more communication systems. The communication device 840 may be configured to be communicatively connected to a communications network, such as the Internet, a local area network or a cellular telephone data network.

The hardware may also include a user interface sensor 845 that allows for receipt of data from input devices 850 such as a keyboard, a mouse, a joystick, a touchscreen, a touch pad, a remote control, a pointing device and/or microphone. Digital image frames also may be received from a camera 820 that can capture video and/or still images of barcodes and/or other items. For computing devices that are part of or in communication with a printing system, the system also may include a print device 880 for acting on a print file to print the pattern within the silhouette on a substrate.

An "electronic device" or a "computing device" refers to a device or system that includes a processor and memory. Each device may have its own processor and/or memory, or the processor and/or memory may be shared with other devices as in a virtual machine or container arrangement. The memory will contain or receive programming instructions that, when executed by the processor, cause the electronic device to perform one or more operations according to the programming instructions. Examples of electronic devices include personal computers, servers, mainframes, virtual machines, containers, gaming systems, televisions, digital home assistants and mobile electronic devices such as smartphones, fitness tracking devices, wearable virtual reality devices, Internet-connected wearables such as smart watches and smart eyewear, personal digital assistants, cameras, tablet computers, laptop computers, media players and the like. Electronic devices also may include appliances and other devices that can communicate in an Internet-of-things arrangement, such as smart thermostats, refrigerators, connected light bulbs and other devices. Electronic devices also may include components of vehicles such as dashboard entertainment and navigation systems, as well as on-board vehicle diagnostic and operation systems. In a client-server arrangement, the client device and the server are electronic devices, in which the server contains instructions and/or data that the client device accesses via one or more communications links in one or more communications networks. In a virtual machine arrangement, a server may be an electronic device, and each virtual machine or container also may be considered an electronic device. In the discussion above, a client device, server device, virtual machine or container may be referred to simply as a "device" for brevity. Additional elements that may be included in electronic devices are discussed above in the context of FIG. 7.

The terms "processor" and "processing device" refer to a hardware component of an electronic device that is configured to execute programming instructions. Except where specifically stated otherwise, the singular terms "processor" and "processing device" are intended to include both single-processing device embodiments and embodiments in which multiple processing devices together or collectively perform a process.

The terms "memory," "memory device," "computer-readable medium," "data store," "data storage facility" and the like each refer to a non-transitory device on which computer-readable data, programming instructions or both are stored. Except where specifically stated otherwise, the terms "memory," "memory device," "computer-readable medium," "data store," "data storage facility" and the like are intended to include single device embodiments, embodiments in which multiple memory devices together or collectively store a set of data or instructions, as well as individual sectors within such devices. A computer program product is a memory device with programming instructions stored on it.

In this document, the terms "communication link" and "communication path" mean a wired or wireless path via which a first device sends communication signals to and/or receives communication signals from one or more other devices. Devices are "communicatively connected" if the devices are able to send and/or receive data via a communication link. "Electronic communication" refers to the transmission of data via one or more signals between two or more electronic devices, whether through a wired or wireless network, and whether directly or indirectly via one or more intermediary devices. The network may include or is configured to include any now or hereafter known communication networks such as, without limitation, a BLUETOOTH® communication network, a Z-Wave® communication network, a wireless fidelity (Wi-Fi) communication network, a ZigBee communication network, a HomePlug communication network, a Power-line Communication (PLC) communication network, a message queue telemetry transport (MQTT) communication network, a MTConnect communication network, a cellular network a constrained application protocol (CoAP) communication network, a representative state transfer application protocol interface (REST API) communication network, an extensible messaging and presence protocol (XMPP) communication network, a cellular communications network, any similar communication networks, or any combination thereof for sending and receiving data. As such, a communication network may be configured to implement wireless or wired communication through cellular networks, WiFi, BlueTooth, Zigbee, RFID, BlueTooth low energy, NFC, IEEE 802.11, IEEE 802.15, IEEE 802.16, Z-Wave, Home Plug, global system for mobile (GSM), general packet radio service (GPRS), enhanced data rates for GSM evolution (EDGE), code division multiple access (CDMA), universal mobile telecommunications system (UMTS), long-term evolution (LTE), LTE-advanced (LTE-A), MQTT, MTConnect, CoAP, REST API, XMPP, or another suitable wired and/or wireless communication method. The network may include one or more switches and/or routers, including wireless routers that connect the wireless communication channels with other wired networks (e.g., the Internet). The data communicated in the network may include data communicated via short messaging service (SMS), multimedia messaging service (MMS), hypertext transfer protocol (HTTP), direct data connection, wireless application protocol (WAP), e-mail, smart energy profile (SEP), ECHONET Lite, OpenADR, MTConnect protocol, or any other protocol.

In this document, the term "camera" refers generally to a hardware sensor that is configured to acquire digital images. A camera may capture still and/or video images, and optionally may be used for other imagery-related applications. For example, a camera can be held by a user such as a DSLR (digital single lens reflex) camera, cell phone camera, or video camera. The camera may be part of an image capturing system that includes other hardware components. For example, a camera can be mounted on an accessory such as a monopod or tripod. A camera may be a component of a portable electronic device such as a smartphone, electronic tablet, augmented reality headset, or smart eyeglasses. A camera can also be mounted on a transporting vehicle such as an aerial drone, a robotic vehicle, or on a piloted aircraft such as a plane or helicopter having a transceiver that can send captured digital images to, and receive commands from, other components of the system.

The terms "printer" and "print device" refer to a device that is configured to perform printing based on digital data contained in a print file, or a multi-functional device in which one of the functions is printing based on such digital data. Example components of a print device include a print head, which may include components such as a print cartridge containing ink, toner or another print material, as well as a document feeding system configured to pass a substrate through the print device so that the print head can print characters and/or images on the substrate.

A "print file" is a file or set of files containing parameters and/or instructions that are configured to cause a print device to print a pattern, text, graphics, or other information on a substrate. Print files may have different configurations depending on the application. For example, print files for direct-to-garment printing may have high-resolution (e.g., at least 180 or at least 240 dpi) data for printing on a substrate, while other applications such as screen printing may use print files with vectorized data for printing data as a mesh, with mesh counts ranging from 100 to 400 microns, by way of example. Such files also may contain instructions or parameters for rendering the pattern, text, graphics, or other information on a substrate. This document may use the term "print device file" to refer to a file having a format and/or information that is specifically for printing, "display device file" to refer to a file having a format and/or information that is specifically for rendering on a display, and "print file" to refer generally to a print device file or a display device file. Example print file formats include the .png, .jpg and/jpeg, .svg, .pdf, .tiff, .eps, and .ai formats, although this disclosure is intended to include print files generated according to any format, including those currently known and those that may be developed in the future.

The features and functions described above, as well as alternatives, may be combined into many other different systems or applications. Various alternatives, modifications, variations or improvements may be made by those skilled in the art, each of which is also intended to be encompassed by the disclosed embodiments.

The various embodiments described above support any or all of the clauses below, which describe various embodiments of the methods and systems that may be claimed in this document.

Clause 1: A method of generating a barcode printing pattern, in which the method comprises, by a processor: (i) identifying a silhouette comprising a boundary; (ii) identifying a two-dimensional (2D) barcode; (iii) generating a barcode pattern comprising a plurality of instances of the 2D barcode, in which the plurality of instances comprise 2D barcodes of at least two different sizes; and (iv) generating a print file comprising a plurality of parameters for printing the barcode pattern within the boundary of the silhouette.

Clause 2: The method of clause 1 further comprising: (a) by the processor or a print device, using the print file to print the barcode pattern within the silhouette on a substrate and/or (b) by the processor or a display device, using the print file to render the barcode pattern within the silhouette on the display device.

Clause 3: The method of clause 1 or 2, further comprising generating the 2D barcode.

Clause 4: The method of any preceding clause, wherein the generating the barcode pattern comprises rotating one or more of the plurality of instances of the 2D barcode in the barcode pattern to provide instances of the 2D barcode positioned in at least two different orientations in the barcode pattern.

Clause 5: The method of any preceding clause, wherein the generating the barcode pattern comprises modifying a size of one or more of the plurality of instances of the 2D barcode in the barcode pattern to provide instances of the 2D barcode of at least two different sizes in the barcode pattern.

Clause 6: The method of any preceding clause, wherein generating the barcode pattern comprises positioning each instance of the 2D barcode at least a minimum distance away from each other instance of the 2D barcode in the barcode pattern.

Clause 7: The method of any preceding clause, wherein generating the print file comprises: (i) identifying a print file canvas comprising a bounded area; (ii) placing at least some of the barcode pattern as a layer within the bounded area of the print file canvas; (iii) placing a silhouette layer over the barcode pattern so that the barcode pattern appears within the boundary of the silhouette and the barcode pattern is masked in all areas outside of the boundary of the silhouette; and (iv) optimizing the silhouette layer to the print file canvas.

Clause 8: The method of clause 7, wherein placing at least some of the barcode pattern as the layer within the bounded area of the print file canvas comprises: (i) placing the barcode pattern within the print file canvas so that each pixel of at least one instance of the barcode that fully appears in the barcode pattern will have no less than a minimum pixel size; (ii) shifting an orientation of the barcode pattern to match an orientation of the print file canvas; and (iii) generating a modified barcode pattern layer by either expanding the barcode pattern to fill the bounded area of the print file canvas or trimming the barcode pattern at borders of the bounded area.

Clause 9: The method of clause 8, wherein placing at least some of the barcode pattern as the layer within the bounded area of the print file canvas comprises placing the barcode pattern within the print file canvas so that each pixel of each instance of the barcode that fully appears in the barcode pattern when printed will have no less than the minimum pixel size.

Clause 10: The method of clause 8 or 9 further comprising, after optimizing the silhouette layer to the print file canvas, re-optimizing the modified pattern barcode pattern layer by expanding or contracting the modified barcode pattern layer to fully fill the silhouette while maintaining the minimum pixel size for at least one instance of the barcode that fully appears within the boundary of the silhouette.

Clause 11: The method of clause 7, 8 or 9, wherein optimizing the silhouette layer to the print file canvas comprises shifting the silhouette layer to cover as much of the bounded area of the print file canvas as possible.

Clause 12: The method of any preceding clause, wherein identifying the 2D barcode comprises identifying a first barcode and a second barcode; and wherein generating barcode pattern comprises generating a plurality of instances of each of the first barcode and the second barcode, in which (a) the plurality of instances of the first barcode comprise barcodes of at least two different sizes, and (b) the plurality of instances of the second barcode also comprise barcodes of at least two different sizes.

Clause 14: The method of any preceding clause, wherein the boundary of the silhouette does not conform to a regular, defined geometric shape.

Clause 14: A computer program product includes a memory device containing programming instructions that are configured to cause a processor to implement a method according to any of clauses 1-12.

Clause 15: A system includes (i) a processor and (ii) a memory device containing programming instructions that are configured to cause the processor to implement a method according to any of clauses 1-12.

Clause 16: The system of clause 15 further comprising a printer for printing the barcode pattern on the substrate.

Clause 17: The system of clause 15 further comprising a display device for rendering the barcode pattern to be viewable on the display device.

The invention claimed is:

1. A method of generating a barcode printing pattern, the method comprising, by a processor:
   identifying a silhouette comprising a boundary;
   identifying a two-dimensional (2D) barcode;
   generating a barcode pattern comprising a plurality of instances of the 2D barcode, in which the plurality of instances comprise 2D barcodes of at least two different sizes; and
   generating a print file comprising a plurality of parameters for printing the barcode pattern within the boundary of the silhouette.

2. The method of claim 1 further comprising, by the processor or a print device, using the print file to print the barcode pattern within the silhouette on a substrate.

3. The method of claim 1, further comprising generating the 2D barcode.

4. The method of claim 1, wherein the generating the barcode pattern comprises rotating one or more of the plurality of instances of the 2D barcode in the barcode pattern to provide instances of the 2D barcode positioned in at least two different orientations in the barcode pattern.

5. The method of claim 1, wherein the generating the barcode pattern comprises modifying a size of one or more of the plurality of instances of the 2D barcode in the barcode pattern to provide instances of the 2D barcode of at least two different sizes in the barcode pattern.

6. The method of claim 1, wherein generating the barcode pattern comprises positioning each instance of the 2D barcode at least a minimum distance away from each other instance of the 2D barcode in the barcode pattern.

7. The method of claim 1, wherein generating the print file comprises:
   identifying a print file canvas comprising a bounded area;
   placing at least some of the barcode pattern as a layer within the bounded area of the print file canvas;
   placing a silhouette layer over the barcode pattern so that:
      the barcode pattern appears within the boundary of the silhouette, and
      the barcode pattern is masked in all areas outside of the boundary of the silhouette; and
   optimizing the silhouette layer to the print file canvas.

8. The method of claim 7, wherein placing at least some of the barcode pattern as the layer within the bounded area of the print file canvas comprises:
   placing the barcode pattern within the print file canvas so that each pixel of at least one instance of the barcode that fully appears in the barcode pattern will have no less than a minimum pixel size;
   shifting an orientation of the barcode pattern to match an orientation of the print file canvas; and
   generating a modified barcode pattern layer by either expanding the barcode pattern to fill the bounded area of the print file canvas or trimming the barcode pattern at borders of the bounded area.

9. The method of claim 8, wherein placing at least some of the barcode pattern as the layer within the bounded area of the print file canvas comprises placing the barcode pattern within the print file canvas so that each pixel of each instance of the barcode that fully appears in the barcode pattern will have no less than the minimum pixel size.

10. The method of claim 8 further comprising, after optimizing the silhouette layer to the print file canvas, re-optimizing the modified pattern barcode pattern layer by expanding or contracting the modified barcode pattern layer to fully fill the silhouette while maintaining the minimum pixel size for at least one instance of the barcode that fully appears within the boundary of the silhouette.

11. The method of claim 7, wherein optimizing the silhouette layer to the print file canvas comprises shifting the silhouette layer to cover as much of the bounded area of the print file canvas as possible.

12. The method of claim 1, wherein:
   identifying the 2D barcode comprises identifying a first barcode and a second barcode; and
   generating the barcode pattern comprises generating a plurality of instances of each of the first barcode and the second barcode, in which:
      the plurality of instances of the first barcode comprise barcodes of at least two different sizes; and
      the plurality of instances of the second barcode also comprise barcodes of at least two different sizes.

13. The method of claim 1, wherein the boundary of the silhouette does not conform to a regular, defined geometric shape.

14. A computer program product for generating a barcode printing pattern, the computer program product comprising a memory device containing programming instructions that are configured to cause a processor to:
   after identifying a silhouette comprising a boundary and identifying a two-dimensional (2D) barcode:
      generate a barcode pattern comprising a plurality of instances of the 2D barcode, in which the plurality of instances comprise 2D barcodes of at least two different sizes; and
      generate a print file comprising a plurality of parameters for printing the barcode pattern within the boundary of the silhouette.

15. A system for generating a barcode printing pattern, the system comprising:
   a processor; and
   a memory device containing programming instructions that are configured to cause the processor to, after identifying a silhouette comprising a boundary and identifying a two-dimensional (2D) barcode:
generate a barcode pattern comprising a plurality of instances of the 2D barcode, in which the plurality of instances comprise 2D barcodes of at least two different sizes; and
generate a print file comprising a plurality of parameters for printing the barcode pattern within the boundary of the silhouette.

16. The system of claim 15, further comprising one or more of the following:
a print device that is capable of using the print file to print the barcode pattern on a substrate; or
a display device that is capable of using the print file to render the barcode pattern to be viewable on the display device.

17. The system of claim 15, wherein the programming instructions to generate the barcode pattern comprise instructions to do one or more of the following:
rotate one or more of the plurality of instances of the 2D barcode in the barcode pattern to provide barcodes positioned in at least two different orientations in the barcode pattern;
modify a size of one or more of the plurality of instances of the 2D barcode in the barcode pattern to provide barcodes of at least two different sizes in the barcode pattern; or
position each instance of the 2D barcode at least a minimum distance away from each other instance of the 2D barcode in the barcode pattern.

18. The system of claim 15, wherein the programming instructions to generate the print file comprise instructions to:
identify a print file canvas comprising a bounded area;
place at least some of the barcode pattern as a layer within the bounded area of the print file canvas;
place a silhouette layer over the barcode pattern so that:
the barcode pattern appears within a boundary of the silhouette layer, and
the barcode pattern is masked in all areas outside of the boundary of the silhouette layer; and
optimize the silhouette layer to the print file canvas.

19. The system of claim 18, wherein the programming instructions to place at least some of the barcode pattern as a layer within the bounded area of the print file canvas comprise instructions to:
place the barcode pattern within the print file canvas so that each pixel of at least one instance of the 2D barcode that appears in the barcode pattern when printed will have no less than a minimum pixel size;
shift an orientation of the barcode pattern to match an orientation of the print file canvas; and
generate a modified barcode pattern layer by either expanding the size of the barcode pattern to fill the bounded area of the print file canvas or trimming the barcode pattern at borders of the bounded area.

20. The system of claim 18, wherein the programming instructions to generate the barcode pattern comprise instructions to, when the 2D barcode comprises a first barcode and a second barcode:
generate a plurality of instances of each of the first barcode and the second barcode, in which:
the plurality of instances of the first barcode comprise barcodes of at least two different sizes; and
the plurality of instances of the second barcode also comprise barcodes of at least two different sizes.

* * * * *